(12) United States Patent
Won et al.

(10) Patent No.: US 8,375,428 B2
(45) Date of Patent: Feb. 12, 2013

(54) PASSWORD INPUT SYSTEM USING ALPHANUMERIC MATRICES AND PASSWORD INPUT METHOD USING THE SAME

(75) Inventors: Yoo-Jae Won, Gyeonggi-do (KR); Hyun-Cheol Jeong, Seoul (KR); Hwan-Jin Lee, Gyeonggi-do (KR); Byoung-Jin Han, Gyeonggi-do (KR)

(73) Assignee: Korea Internet & Security Agency, Seoul (KR)

( * ) Notice: Subject to any disclaimer, the term of this patent is extended or adjusted under 35 U.S.C. 154(b) by 169 days.

(21) Appl. No.: 12/824,761

(22) Filed: Jun. 28, 2010

(65) Prior Publication Data
US 2011/0004928 A1    Jan. 6, 2011

(30) Foreign Application Priority Data
Jul. 3, 2009  (KR) ........................ 10-2009-0060657

(51) Int. Cl.
*H04L 9/32* (2006.01)
*G06F 21/00* (2006.01)
(52) U.S. Cl. ............................. 726/7; 713/182; 713/185
(58) Field of Classification Search .................. None
See application file for complete search history.

(56) References Cited

U.S. PATENT DOCUMENTS

| 4,760,386 A | 7/1988 | Heath ............................ 340/709 |
| 6,246,769 B1 * | 6/2001 | Kohut .............................. 380/45 |
| 8,117,458 B2 * | 2/2012 | Osborn et al. ................. 713/183 |
| 2007/0011738 A1 * | 1/2007 | Doss ................................ 726/18 |
| 2009/0037986 A1 * | 2/2009 | Baker ................................. 726/5 |

FOREIGN PATENT DOCUMENTS

| JP | 62-293333 | 12/1987 |
| JP | 2005-208996 | 8/2005 |
| JP | 2005-535990 | 11/2005 |
| JP | 2008-033924 | 2/2006 |
| KR | 10 2001 01098 | 12/2001 |

* cited by examiner

*Primary Examiner* — Fikremariam A Yalew
(74) *Attorney, Agent, or Firm* — Renner, Otto, Boisselle & Sklar, LLP

(57) ABSTRACT

The present invention relates to a password input algorithm, more particularly to a password input system and method using alphanumeric matrices. An aspect of the invention can provide a password input system and method using alphanumeric matrices that can defend against keylogging attacks and shoulder surfing attacks by including a movable second alphanumeric matrix and a fixed first alphanumeric matrix and enabling a user to input a password by moving the password letters of the second alphanumeric matrix to the user-defined value of the first alphanumeric matrix. Another aspect of the invention can provide a password input system and method using alphanumeric matrices that can defend against shoulder surfing attacks by enabling a user to input a password by dividing the password by every two digits and moving the cross-points for the two digits, respectively, to the user-defined value of the first alphanumeric matrix.

7 Claims, 14 Drawing Sheets

| | | | | | | |
|---|---|---|---|---|---|---|
| G_G | N_N | 6_6 | $_$ | -_- | S_S | Z_Z |
| F_F | M_M | 5_5 | #_# | )_) | R_R | Y_Y |
| E_E | L_L | 4_4 | @_@ | (_( | Q_Q | X_X |
| D_D | K_K | 3_3 | !_! | *_* | P_P | W_W |
| C_C | J_J | 2_2 | 9_9 | &_& | O_O | V_V |
| B_B | I_I | 1_1 | 8_8 | <_< | +_+ | U_U |
| A_A | H_H | 0_0 | 7_7 | %_% | =_= | T_T |

|   | A | B | C | D | E | F | G |
|---|---|---|---|---|---|---|---|
| H | I | J | K | L | M | N |
| O | P | Q | R | S | T | U |
| V | W | X | Y | Z | 0 | 1 |
| 2 | 3 | 4 | 5 | 6 | 7 | 8 |
| 9 | : | @ | # | $ | % | < |
| & | * | ( | ) | - | + | = |

| $G_G$ | $N_N$ | $6_6$ | $\$_\$$ | $-_-$ | $S_S$ | $Z_Z$ |
|---|---|---|---|---|---|---|
| $F_F$ | $M_M$ | $5_5$ | $\#_\#$ | $)_)$ | $R_R$ | $Y_Y$ |
| $E_E$ | $L_L$ | $4_4$ | $@_@$ | $(_($ | $Q_Q$ | $X_X$ |
| $D_D$ | $K_K$ | $3_3$ | $!_!$ | $*_*$ | $P_P$ | $W_W$ |
| $C_C$ | $J_J$ | $2_2$ | $9_9$ | $\&_\&$ | $O_O$ | $V_V$ |
| $B_B$ | $I_I$ | $1_1$ | $8_8$ | $<_<$ | $+_+$ | $U_U$ |
| $A_A$ | $H_H$ | $0_0$ | $7_7$ | $\%_\%$ | $=_=$ | $T_T$ |

(a)

| $G_A$ | $N_B$ | $6_C$ | $\$_D$ | $-_E$ | $S_F$ | $Z_G$ |
|---|---|---|---|---|---|---|
| $F_H$ | $M_I$ | $5_J$ | $\#_K$ | $)_L$ | $R_M$ | $Y_N$ |
| $E_O$ | $L_1$ | $4_2$ | $@_3$ | $(_4$ | $Q_5$ | $X_6$ |
| $D_7$ | $K_8$ | $3_9$ | $!_;$ | $*_@$ | $P_\#$ | $W_\$$ |
| $C_\%$ | $J_<$ | $2_\&$ | $9_*$ | $\&_($ | $O_)$ | $V_-$ |
| $B_=$ | $I_+$ | $1_O$ | $8_P$ | $<_Q$ | $+_R$ | $U_S$ |
| $A_T$ | $H_U$ | $0_V$ | $7_W$ | $\%_X$ | $=_Y$ | $T_Z$ |

| $A_A$ | $B_B$ | $C_C$ | $D_D$ | $E_E$ | $F_F$ | $G_G$ |
|---|---|---|---|---|---|---|
| $H_H$ | $I_I$ | $J_J$ | $K_K$ | $L_L$ | $M_M$ | $N_N$ |
| $0_0$ | $1_1$ | $2_2$ | $3_3$ | $4_4$ | $5_5$ | $6_6$ |
| $7_7$ | $8_8$ | $9_9$ | $!_!$ | $@_@$ | $\#_\#$ | $\$_\$$ |
| $\%_\%$ | $<_<$ | $\&_\&$ | $*_*$ | $(_($ | $)_)$ | $-_-$ |
| $=_=$ | $+_+$ | $O_o$ | $P_p$ | $Q_q$ | $R_r$ | $S_s$ |
| $T_T$ | $U_U$ | $V_V$ | $W_W$ | $X_X$ | $Y_Y$ | $Z_Z$ |

PASSWORD INPUT SYSTEM USING ALPHANUMERIC MATRICES AND PASSWORD INPUT METHOD USING THE SAME

CROSS-REFERENCE TO RELATED APPLICATIONS

This application claims the benefit of Korean Patent Application No. 10-2009-0060657, filed with the Korean Intellectual Property Office on Jul. 3, 2009, the disclosure of which is incorporated herein by reference in its entirety.

BACKGROUND

1. Technical Field

The present invention relates to a password input algorithm, more particularly to a password input system and method using alphanumeric matrices.

2. Description of the Related Art

Generally, when using an Internet website or Internet banking, etc., an ID and password may be inputted for identification purposes. However, the existing method of inputting a password using a keyboard is highly vulnerable to keylogging attacks, in which the ID, password, etc., are discovered by recording the key information inputted by the user, and shoulder surfing attacks, in which the ID, password, etc., are discovered by looking over the user's shoulder (Shoulder surfing refers to any attack that may occur in a space that is beyond one's control and includes not only simple overlooking but also attacks using video images from CCTV cameras, etc.).

Of the 245 million types of malicious codes detected and blocked by Symantec Corp. each month last year, 90% targeted confidential information, and 76% of these were related to keylogging, for retrieving the keyboard input information of a user to steal authentication information for Internet bank accounts, etc. Numerous techniques have been developed to address this problem, i.e. that of complementing the keyboard-based password input method, and the most current of these techniques can be classified mainly into those using graphics and those requiring a person's computational abilities.

Certain current Internet banking sites have adopted the password input techniques using graphics, where the password (numbers) may be inputted by using a mouse. In most of these cases, the password is not a 6 to 8 digit combination of alphabet letters and numbers, but a 4 to 6 digit combination of numbers. The technique by which the password (numbers) is inputted using a mouse, as adopted by such Internet banking sites, may involve a number grid that is randomly generated on the screen whenever an input is made, rendering a keylogging attack ineffective. However, since this input involves inputting the numbers themselves, this technique can be vulnerable to shoulder surfing attacks. Due to this vulnerability of password input methods, the user is recommended not to use Internet banking services, or other websites, online games, etc., that require logging in, in a public environment, such as in an Internet café and on a public PC. In cases where it is unavoidably necessary to input a password using a keyboard in a public environment, and in cases subject to shoulder surfing, a user may suffer losses or may feel anxious about the possibility of information theft.

As such, there is a need to develop a password input method that is robust against both keylogging attacks and shoulder surfing attacks, so that users may feel at ease even when unavoidably using a password in a public environment.

SUMMARY

An aspect of the invention is to provide a password input system using alphanumeric matrices, and a password input method using the same, which can counter keylogging attacks and shoulder surfing attacks.

To achieve the objective above, an aspect of the invention provides a password input system using alphanumeric matrices that includes: a first and a second alphanumeric matrix; an alphanumeric matrix movement module configured to move each letter of a password included in the second alphanumeric matrix to a user-defined value, which is included in the first alphanumeric matrix and arbitrarily designated by a user; and a password input confirmation module configured to confirm a password that is inputted as the second alphanumeric matrix is moved to the first alphanumeric matrix. The password input system can further include an alphanumeric matrix rotation/shuffle module configured to rotate or shuffle at least one of the first alphanumeric matrix and the second alphanumeric matrix whenever a movement of the second alphanumeric matrix to the first alphanumeric matrix is completed. An input tool for moving the second alphanumeric matrix may be selected from a keyboard, a keypad, a mouse, and a touchscreen. A mouse pointer removal module can further be included, to remove a pointer of the mouse.

Another aspect of the invention provides a password input method using two alphanumeric matrices, which includes a fixed first alphanumeric matrix and a movable second alphanumeric matrix. The password input method includes: designating an arbitrary user-defined value from letters included in the first alphanumeric matrix; and moving the second alphanumeric matrix to move each letter included in the second alphanumeric matrix forming a password to the user-defined value of the first alphanumeric matrix. Moving the second alphanumeric matrix to move each letter included in the second alphanumeric matrix forming a password to the user-defined value of the first alphanumeric matrix can further include rotating a whole of or shuffling a row or a column of at least one of the first alphanumeric matrix and the second alphanumeric matrix, whenever an input of one letter is completed by moving the second alphanumeric matrix to move one letter included in the second alphanumeric matrix forming a password to the user-defined value of the first alphanumeric matrix. Designating the arbitrary user-defined value from letters included in the first alphanumeric matrix can include: designating two different user-defined values from letters included in the first alphanumeric matrix; and designating a user-defined value as a cross-point of a row and a column of the two user-defined values, respectively, in the first alphanumeric matrix.

Yet another aspect of the invention provides a method of inputting a password having n digits, using two alphanumeric matrices, which include a fixed first alphanumeric matrix and a movable second alphanumeric matrix. The password input method includes: designating a user-defined value from letters included in the first alphanumeric matrix; remembering a password letter sequence having two digits from letters forming the password; finding a cross-point of a row of a first letter and a column of a second letter of the two-digit password letter sequence in the second alphanumeric matrix; and successively moving the cross-point of the second alphanumeric matrix to the user-defined value of the first alphanumeric matrix by moving the second alphanumeric matrix. The two-digit password letter sequences can be formed as {[first digit, second digit], [second digit, third digit], . . . , [n-th digit, first digit]} of the password. Successively moving the cross-point of the second alphanumeric matrix to the user-defined value of the first alphanumeric matrix by moving the second alphanumeric matrix can further include rotating a whole of or shuffling a row or a column of at least one of the first alphanumeric matrix and the second alphanumeric matrix, whenever an input of one cross-point of the two-digit password letter sequence is completed by moving the second alphanumeric matrix to move one cross-point of the two-digit password letter sequence included in the second alphanumeric matrix to the user-defined value of the first alphanumeric matrix. Designating the arbitrary user-defined value from letters included in the first alphanumeric matrix can include: designating two different user-defined values from letters included in the first alphanumeric matrix; and designating a user-defined value as a cross-point of a row and a column of the two user-defined values, respectively, in the first alphanumeric matrix.

An aspect of the invention can provide a password input system and method using alphanumeric matrices that can defend against keylogging attacks and shoulder surfing attacks by including a movable second alphanumeric matrix and a fixed first alphanumeric matrix and enabling a user to input a password by moving the password letters of the second alphanumeric matrix to the user-defined value of the first alphanumeric matrix.

Another aspect of the invention can provide a password input system and method using alphanumeric matrices that can defend against shoulder surfing attacks by enabling a user to input a password by dividing the password by every two digits and moving the cross-points for the two digits, respectively, to the user-defined value of the first alphanumeric matrix.

Another aspect of the invention can provide a password input system and method using alphanumeric matrices that can more reliably defend against shoulder surfing attacks by rotating at least one of the first alphanumeric matrix and the second alphanumeric matrix every time a password letter is inputted.

Still another aspect of the invention can provide a password input system and method using alphanumeric matrices that can more reliably defend against keylogging attacks and shoulder surfing attacks by using the cross-point of two user-defined values.

Additional aspects and advantages of the present invention will be set forth in part in the description which follows, and in part will be obvious from the description, or may be learned by practice of the invention.

BRIEF DESCRIPTION OF THE DRAWINGS

FIG. 3 illustrates the designating of a user-defined value in the alphanumeric matrices according to the first disclosed embodiment of the invention.

FIG. 4 illustrates the moving of a password letter to the user-defined value in the alphanumeric matrices according to the first disclosed embodiment of the invention.

FIG. 5 illustrates a password letter cross-point in the alphanumeric matrices according to the first disclosed embodiment of the invention.

FIG. 6 illustrates the moving of the password letter cross-point to the user-defined value in the alphanumeric matrices according to the first disclosed embodiment of the invention.

FIG. 7 illustrates the rotation of an alphanumeric matrix according to the first disclosed embodiment of the invention.

FIG. 8 illustrates the shuffling of an alphanumeric matrix according to the first disclosed embodiment of the invention.

FIG. 9 illustrates two alphanumeric matrices having the same level of similarity.

FIG. 10 illustrates two alphanumeric matrices having a different level of similarity.

FIG. 12 illustrates the finding of the cross-point of two user-defined values in the alphanumeric matrices according to the second disclosed embodiment of the invention.

FIG. 13 illustrating the moving of a password letter to the user-defined value cross-point in the alphanumeric matrices according to the second disclosed embodiment of the invention.

FIG. 14 illustrates the moving of a password letter cross-point to the user-defined value cross-point in the alphanumeric matrices according to the second disclosed embodiment of the invention.

DETAILED DESCRIPTION

A detailed description of certain embodiments of the invention will be provided below with reference to the accompanying drawings. However, the invention is not limited to the embodiments disclosed below and can be implemented in various forms, as the embodiments are intended simply for complete disclosure of the invention and for complete understanding of the invention by those of ordinary skill in the art. In the accompanying drawings, like numerals refer to like components.

Figure 1:
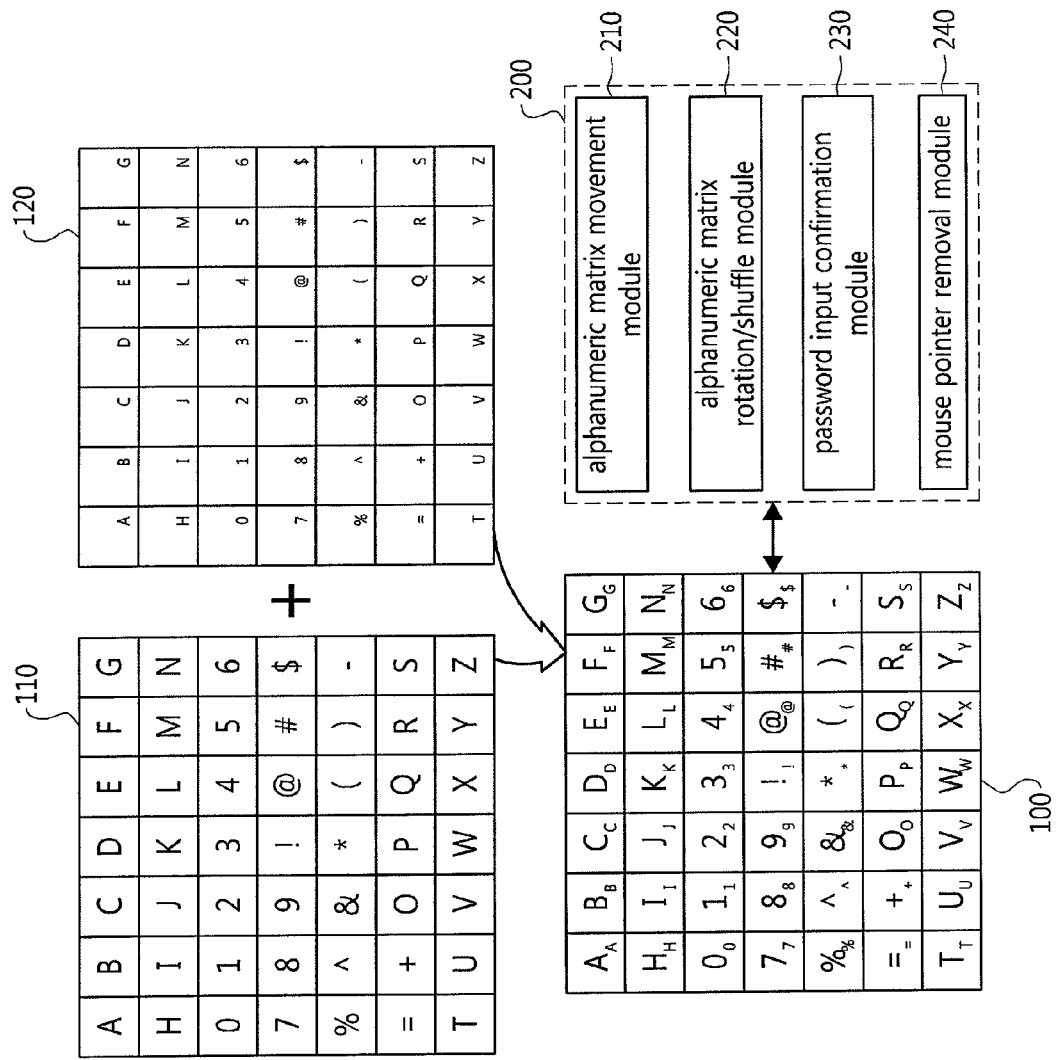
FIG. 1 is a schematic diagram illustrating a password input system using alphanumeric matrices according to an aspect of the invention.

FIG. 1 is a schematic diagram illustrating a password input system using alphanumeric matrices according to an aspect of the invention.

As illustrated in FIG. 1, a password input algorithm using alphanumeric matrices according to an aspect of the invention may include alphanumeric matrices 100 and an alphanumeric matrix operation module 200.

The alphanumeric matrices 100 are to enable a user to input a password. The alphanumeric matrices 100 may include a first alphanumeric matrix 110 and a second alphanumeric matrix 120, the second alphanumeric matrix 110 for inputting the letters of the password to the user-defined value of the first alphanumeric matrix 110, and the first alphanumeric matrix 110 for designating the user-defined value.

The alphanumeric matrices 100 may include letters arranged in the form of matrices and can include the 26 alphabet letters from 'A' to 'Z', the 10 numbers from '0' to '9', the 13 special characters from '!' to '=', and so on. Here, the letters of an alphanumeric matrix can include not only alphabet letters, i.e. of the English language, but also the letters of other common languages worldwide, such as the consonants and vowels of the Korean Hangul, Chinese characters, Japanese letters, etc. It may be desirable to have the letters of the alphanumeric matrix correspond to the English alphabet or to the local language of the country in which the invention is applied. For example, if an embodiment of the invention is applied in Korea, the letters of the alphanumeric matrix can include English letters, numbers, and special characters, or alternatively, Hangul consonants or vowels, numbers, and special characters. It may be desirable that the special characters include those listed above, i.e. the special characters available on a keyboard. Of course, other special characters other than those of this embodiment can also be used, including characters such as '[', ']', '{', '}', '"', ';', etc., that are also available on a keyboard, and patterns, etc., that are not available on a keyboard. Also, the alphanumeric matrix can be a 7×7 alphanumeric matrix, as illustrated in FIG. 1, to support letter sequences. However, the invention is not thus limited, and the sizes of the first and second alphanumeric matrices 110, 120 can be adjusted to 6×6, 8×8, etc., according to the number of letters required. Of course, adjusting the sizes of the alphanumeric matrices may involve adjusting the letters included in the alphanumeric matrices.

The alphanumeric matrix operation module 200 is for matrix operation, such as moving and rotating the alphanumeric matrices 100, as well as for confirming password input. The alphanumeric matrix operation module 200 may include an alphanumeric matrix movement module 210, an alphanumeric matrix rotation/shuffle module 220, a password input confirmation module 230, and a mouse pointer removal module 240.

The alphanumeric matrix movement module 210 is for moving the second alphanumeric matrix 120, where the user may look for a password from the second alphanumeric matrix 120 one letter at a time and move it to the first alphanumeric matrix 110. Here, the first alphanumeric matrix 110, for designating the user-defined value, may remain still without being moved.

Inputting a password can be achieved by, but is not limited to, simply looking for each letter of the password in the second alphanumeric matrix 120 and moving it to the user-defined value of the first alphanumeric matrix 110. That is, the inputting of a password can also be achieved by dividing the letters forming the password into two digits such that the first-digit letters are interrelated, finding the two-digit letters in the second alphanumeric matrix 120, finding the cross-point of the row in which the first letter is located and the column in which the second letter is located, and moving this cross-point to the user-defined value of the first alphanumeric matrix 110. In addition, it is also possible to input a password by designating two user-defined values, finding the two user-defined values in the first alphanumeric matrix 110 and finding the user-defined value cross-point where the respective row and column meet, and moving the letters of the password or the cross-points of the password. Of course, it is possible to define the cross-point as a crossing point of the row of the first letter (or the first user-defined value) and the column of the second letter (or the second user-defined value), from among the two-digit letter sequence or two user-defined values, and it is also possible to define the cross-point as a crossing point of the column of the first letter (or the first user-defined value) and the row of the second letter (or the second user-defined value). It is important, here, that the method of finding the cross-point be kept consistent. Furthermore, every time an input of a password letter or a cross-point of the password is completed, at least one of the first alphanumeric matrix 110 and the second alphanumeric matrix 120 can be rotated by 90, 180, or 270 degrees or shuffled, i.e. having rows and/or columns moved by one or more squares.

With regard to the password letters, cross-points of the password, and the user-defined values, it is also possible to input a password by moving a corresponding letter in a particular direction, instead of directly selecting the corresponding letter. For example, if a letter of the password, a password cross-point, or a user-defined value is 'D', then the user may, instead of selecting 'D' directly, select one of the letters surrounding 'D', for example, the letter 'L' that is in the lower right diagonal square from 'D', as the password letter, password cross-point, or user-defined value. Of course, a letter in a position following a certain rule, other than being in the lower right diagonal position, for example, the letter that is two squares below and one square to the right, can also be selected as the password letter, password cross-point, or user-defined value. In this case, it is possible to input a password without a user-defined value and using just one alphanumeric matrix. That is, instead of inputting 'D', a user can input a password by selecting a letter adjacent to 'D' rather than selecting 'D' directly, selecting 'L' in the lower right diagonal position from 'D', for example, in one alphanumeric matrix. Here, since there is one alphanumeric matrix, the password of the alphanumeric matrix can be selected by direct input or by clicking, using a keyboard, keypad, or mouse. Since, with the method described above, the password letters may be inputted in a particular pattern, it may be desirable, in terms of defending against keylogging attacks and shoulder surfing attacks, to refrain from inputting passwords in a constant pattern, and instead selecting the letter input direction randomly from several different directions, such as the lower right diagonal direction, the lower left diagonal direction, etc., every time a whole password is inputted. With this method of inputting a password also, the password itself is not selected directly, so that a certain degree of protection is obtained against keylogging or shoulder surfing attacks.

The alphanumeric matrix rotation/shuffle module 220 may rotate or shuffle at least one of the first alphanumeric matrix 110 and the second alphanumeric matrix 120 in a certain direction. Here, rotating the first alphanumeric matrix 110 and second alphanumeric matrix 120 can be performed as a 90-degree, 180-degree, or 270-degree rotation in the left or right direction. Also, shuffling the first alphanumeric matrix 110 and second alphanumeric matrix 120 can be performed by moving the rows and/or columns of the first alphanumeric matrix 110 and second alphanumeric matrix 120 by one or more squares, i.e. shuffling. Such rotation and/or shuffling of the alphanumeric matrices can be more effective when performed every time the second alphanumeric matrix 120 is moved by the alphanumeric matrix movement module to the first alphanumeric matrix 110 to complete the input of a letter of the password.

The password input confirmation module 230 may confirm whether or not the password inputted by the user is inputted correctly. If the password inputted by the user is not inputted correctly, the password input confirmation module may send an error message to the user, and conversely, if the password inputted by the user is inputted correctly, the password input confirmation module may send a password confirmation message to the system. Furthermore, the system, upon receiving the password confirmation message, may complete the user identification process.

In cases where the direction keys of a keyboard are used to input the password, the input of each letter forming the password can be completed using the enter key of the keyboard. Also, in cases where a mouse or a touchscreen is used to input the password, the input of each letter forming the password can be completed by releasing the button of the mouse or removing the finger or an input pointer from the touchscreen after moving the second alphanumeric matrix 120 to the first alphanumeric matrix 110.

In cases where an embodiment of the invention is applied to an apparatus equipped with a mouse, rather than a touchscreen or a keyboard having direction keys, and the second alphanumeric matrix 120 is moved to the first alphanumeric matrix 110 with the mouse, the mouse pointer removal module 240 may serve to remove the pointer of the mouse. Here, the removal of the mouse pointer may desirably be performed before the motion by which the user clicks on the second alphanumeric matrix 120 and moves it to the first alphanumeric matrix 110 is completed. Of course, the mouse pointer removal module 240 can be omitted in cases where the invention is applied to an apparatus equipped with a touchscreen, such as a cell phone, PDA, ATM, etc., but if the apparatus is one in which a mouse pointer is visually perceived by the user, it may be desirable to include the mouse pointer removal module 240 regardless of whether or not a touchscreen is included.

As described above, an aspect of the invention can provide a password input system using alphanumeric matrices in which a password is inputted by way of a movable second alphanumeric matrix 120 and a fixed first alphanumeric matrix 110, so that the system is capable of providing protection against keylogging attacks and shoulder surfing attacks.

A description will now be provided, with reference to the accompanying drawings, on a password input method using alphanumeric matrices according to a first disclosed embodiment of the invention that utilizes a password input system using alphanumeric matrices described above. In the descriptions that follow, certain content that is redundant over the descriptions provided above regarding a password input algorithm using alphanumeric matrices according to an aspect of the invention will be omitted or abridged.

Figure 2:
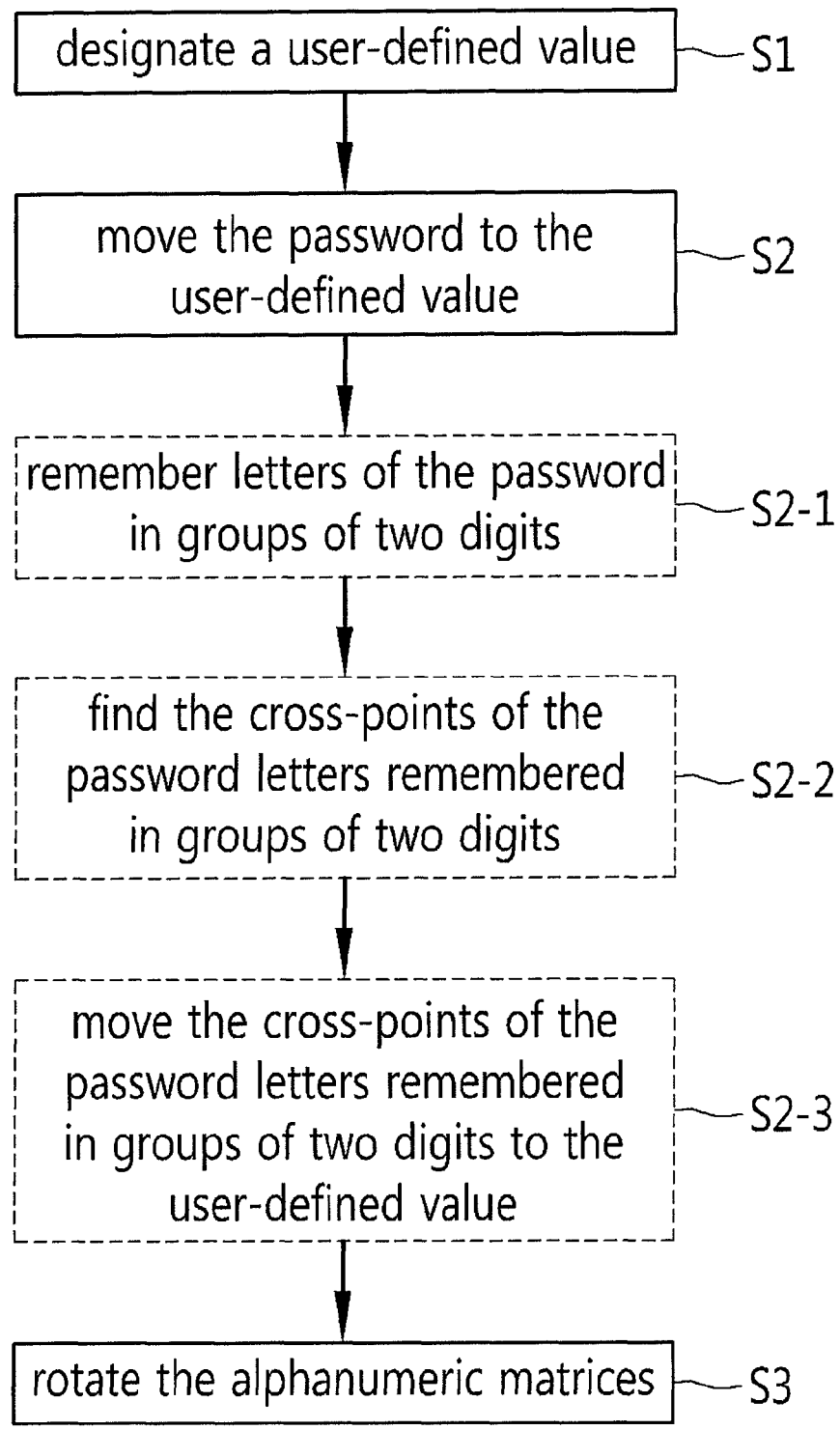
FIG. 2 is a flowchart illustrating a password input method using alphanumeric matrices according to a first disclosed embodiment of the invention.
Figure 4:
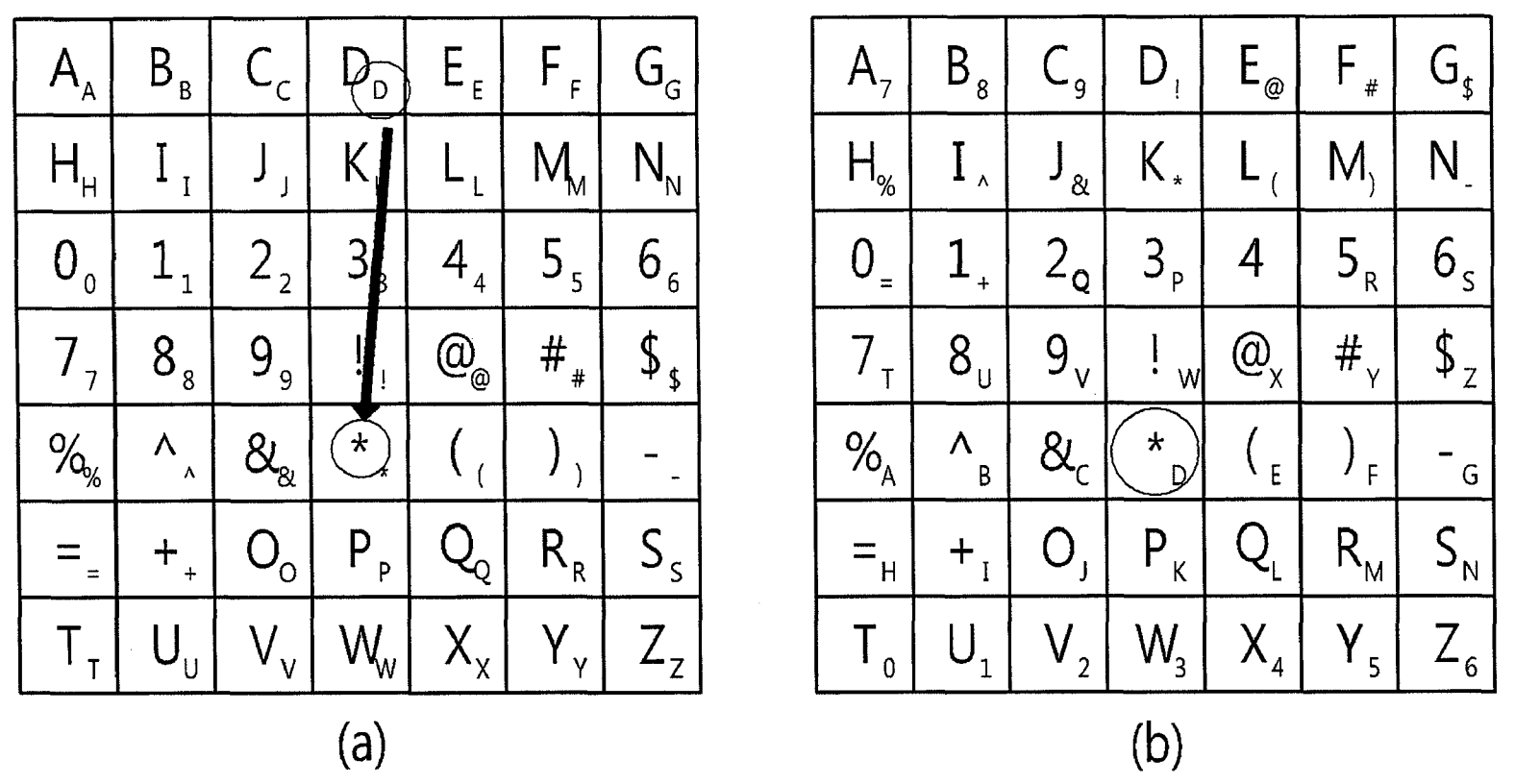
Figure 6:
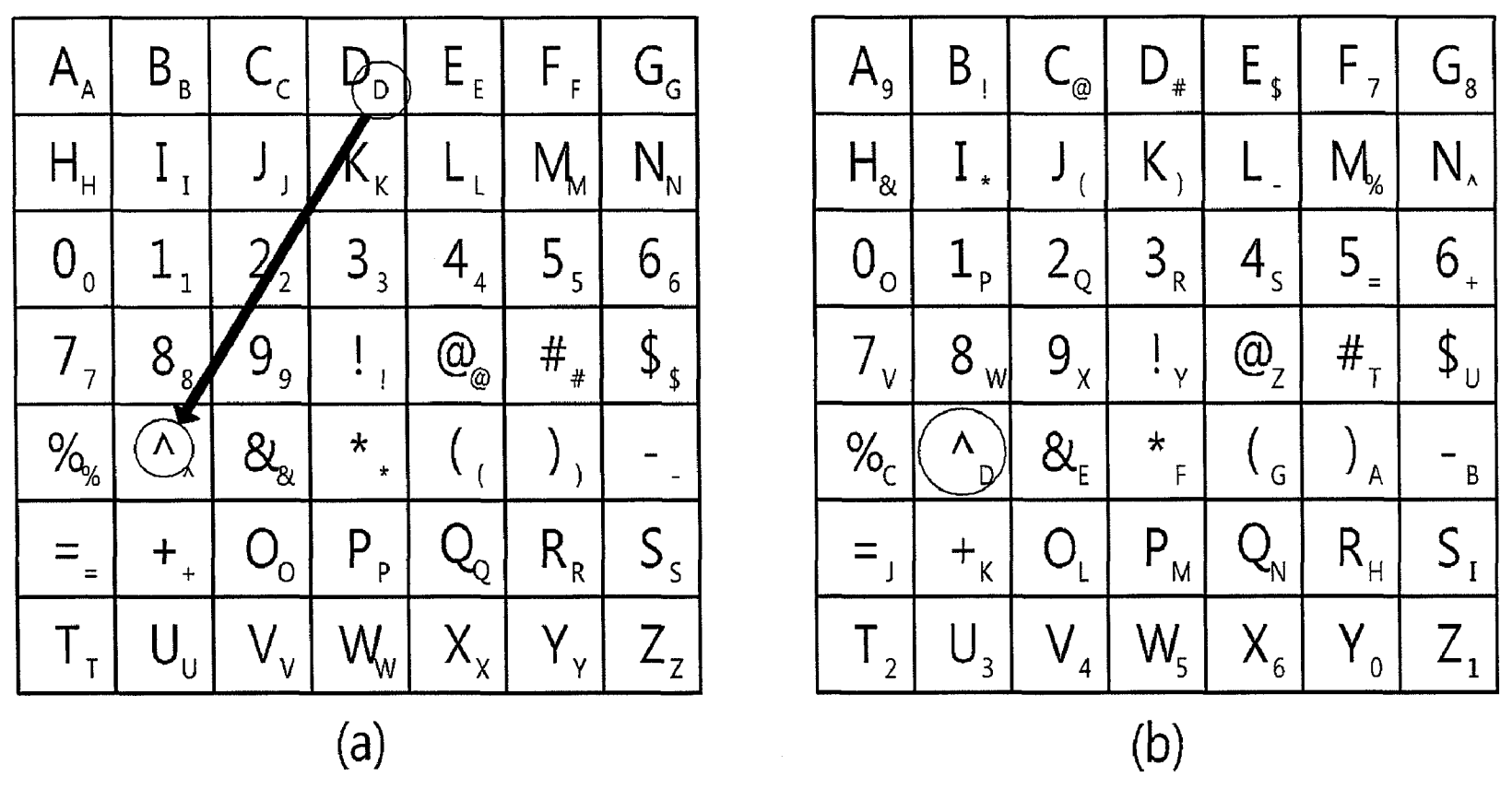
Figure 8:
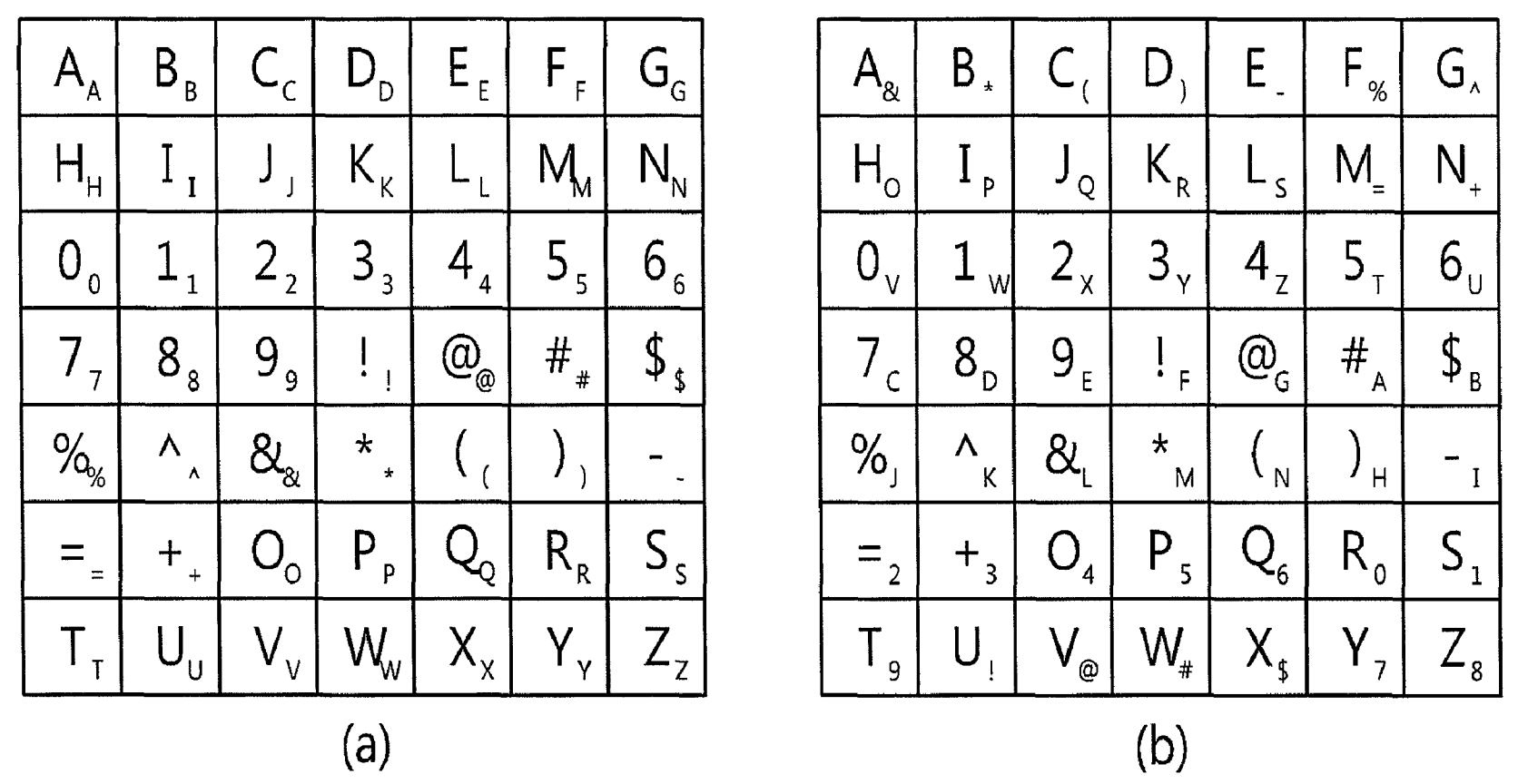
Figure 9:
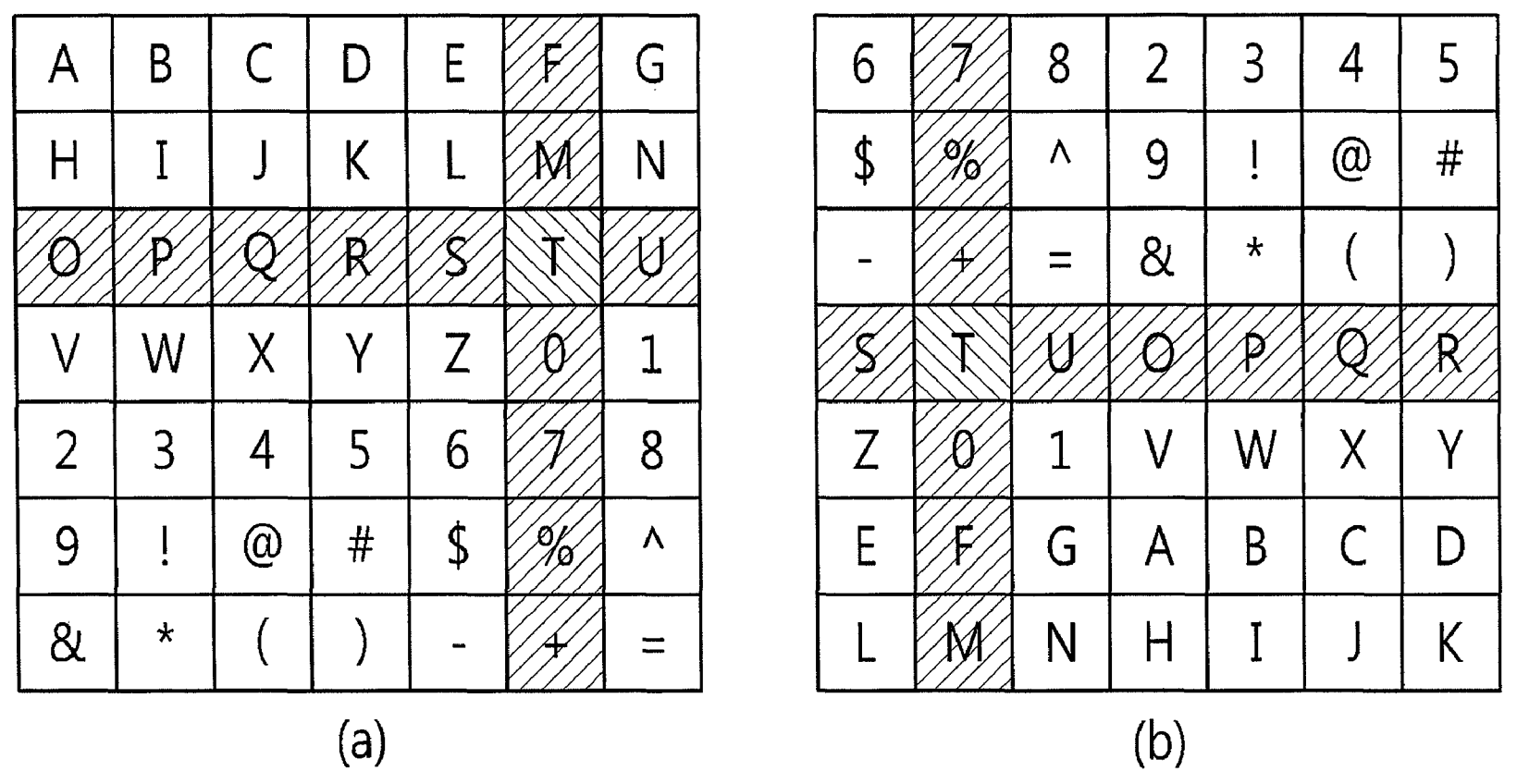
Figure 10:
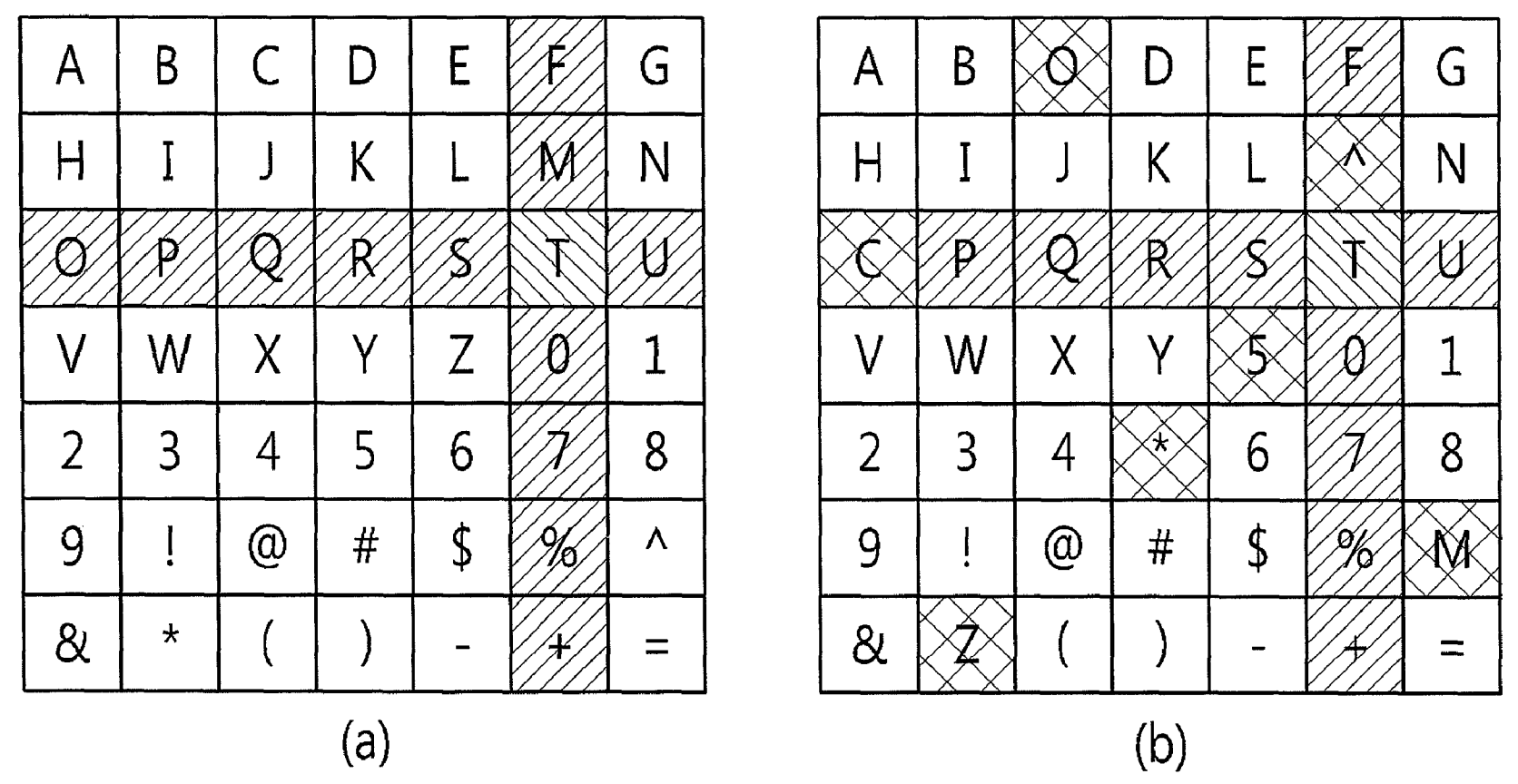

FIG. 2 is a flowchart illustrating a password input method using alphanumeric matrices according to the first disclosed embodiment of the invention, and FIG. 3 illustrates the designating of a user-defined value in the alphanumeric matrices according to the first disclosed embodiment of the invention. Also, FIG. 4 illustrates the moving of a password letter to the user-defined value in the alphanumeric matrices according to the first disclosed embodiment of the invention, and FIG. 5 illustrates a password letter cross-point in the alphanumeric matrices according to the first disclosed embodiment of the invention. Also, FIG. 6 illustrates the moving of the password letter cross-point to the user-defined value in the alphanumeric matrices according to the first disclosed embodiment of the invention, and FIG. 7 illustrates the rotation of an alphanumeric matrix according to the first disclosed embodiment of the invention. FIG. 8 illustrates the shuffling of an alphanumeric matrix according to the first disclosed embodiment of the invention. FIG. 9 illustrates two alphanumeric matrices having the same level of similarity, and FIG. 10 illustrates two alphanumeric matrices having a different level of similarity.

As illustrated in FIG. 2, a password input method using alphanumeric matrices according to the first disclosed embodiment of the invention may include designating a user-defined value ($S_1$), moving the password to the user-defined value ($S_2$), and rotating the alphanumeric matrices ($S_3$).

The step of designating a user-defined value ($S_1$) may include designating a random letter included in the first alphanumeric matrix as the user-defined value. The user-defined value is a letter arbitrarily chosen by the user from among the letters included in the first alphanumeric matrix, and designating the user-defined value can be performed by the user remembering an arbitrary letter included in the first alphanumeric matrix. As illustrated in FIG. 3, this embodiment will be illustrated using an example in which '*' of the first alphanumeric matrix is chosen as the user-defined value. Here, the matrix including smaller letters is the second alphanumeric matrix, while the matrix including larger letters is the first alphanumeric matrix.

The step of moving the password to the user-defined value ($S_2$) may include moving the password of the second alphanumeric matrix to the user-defined value of the first alphanumeric matrix, as illustrated in FIG. 4. For example, if the user-defined value is '*', and the password is 'DRAGON', the user may successively move the 'D', 'R', 'A', 'G', 'O', and 'N' of the second alphanumeric matrix to the '*' of the first alphanumeric matrix. Here, the first alphanumeric matrix is fixed on the screen, while the second alphanumeric matrix is freely movable. Thus, using the arrow keys of the keyboard, the second alphanumeric matrix can be moved such that the password is moved to the user-defined value. Since an attacker may acquire only the arrow directions on the keyboard inputted by the user, i.e. only '→' and '↓' inputted by the user, it will be difficult for the attacker to discover the actual password inputted by the user. Of course, while this embodiment has been illustrated using an example in which the arrows of a keyboard serve as the input tool, the invention is not thus limited, and any type of input tool can be used that is capable of implementing an up, down, left, right input.

With a password input method using alphanumeric matrices according to the first disclosed embodiment of the invention, it is possible to input a password simply by moving the password to the user-defined value as described above, but it is also possible to move a cross-point of the password to the user-defined value. For this, the step of moving the password to the user-defined value ($S_2$) may include remembering the letters of the password in groups of two digits ($S_{2-1}$), finding the cross-points of the password letters remembered in groups of two digits ($S_{2-2}$), and moving the cross-points of the password letters remembered in groups of two digits to the user-defined value ($S_{2-3}$).

The step of remembering the letters of the password in groups of two digits ($S_{2-1}$) may include the user remembering the password in groups of two digits, starting from the front. For example, if the password is 'DRAGON', then the user may remember 'DRAGON' as 'DR', 'RA', 'AG', 'GO', 'ON', 'ND', i.e. in groups of two digits such that the front-digit letters are interrelated. Of course, the invention is not thus limited, and it is also possible to simply remember the password for every two digits. That is, if the password is 'DRAGON', then the user can remember 'DRAGON' as 'DR', 'AG', 'ON'. Also, the password can be remembered in groups of two digits with a basis on the letter of a particular position. For example, using 'D' in 'DRAGON' as the basis, each letter of the password can be remembered by grouping 'D' with each of 'R', 'A', 'G', 'O', 'N' as 'DR', 'DA', 'DG', 'DO', 'DN'.

The step of finding the cross-points of the password letters remembered in groups of two digits ($S_{2-2}$) may include finding the cross-points for the password letters remembered in groups of two digits in the second alphanumeric matrix. Here, using x, y to represent the first two-digit letter group of the password, the computation of $f(x,y)=z$ may be determined by the rows and columns of letters x, y as positioned in the second alphanumeric matrix. For example, if the password is 'DRAGON', the first password letter cross-point for 'DR' is 'D', which is positioned at the cross-point of 'D' and 'R' in the second alphanumeric matrix, as illustrated in FIG. 5. That is, for finding f(x,y), the user may select a row and column according to the positions for each letter sequence in the second alphanumeric matrix. There is always a cross-point for the row and column thus selected, and the cross-point is the result of the computation. In the above case for 'D' and 'R', $f(D,R)=D*R=D$. In like manner, for 'RA' in FIG. 5, the 'O' positioned at the cross-point of 'R' and 'A' in the second alphanumeric matrix becomes the second password letter cross-point. Also, for 'AG', the 'G' positioned at the cross-point of 'A' and 'G' in the second alphanumeric matrix becomes the third password letter cross-point, and for 'GO', the 'A' positioned at the cross-point of 'G' and 'O' in the second alphanumeric matrix becomes the fourth password letter cross-point. Also, for 'ON', the 'U' positioned at the cross-point of 'O' and 'N' in the second alphanumeric matrix becomes the fifth password letter cross-point, and for 'ND', the 'K' positioned at the cross-point of 'N' and 'D' in the second alphanumeric matrix becomes the sixth password letter cross-point. Thus, the first to sixth password letter cross-points, namely, 'D', 'O', 'G', 'A', 'U', and 'K' become the password letter cross-points for the password 'DRAGON'. With this setup, it is difficult to make out which two letters were originally used as input for the computation, even when the user selects a cross-point. That is, an attacker can only obtain information regarding the row and column in which the two letters are positioned.

The step of moving the cross-points of the password letters remembered in groups of two digits to the user-defined value ($S_{2-3}$) may include moving the cross-points of the password letters in the second alphanumeric matrix, found in the above step of finding the cross-points of the password letters remembered in groups of two digits ($S_{2-2}$), to the user-defined value in the first alphanumeric matrix, and thereby inputting the password. That is, if the password is 'DRAGON', and the user-defined value is '^', then the user may find the first password letter cross-point 'D' and the user-defined value '^' as in FIG. 6(a), and then move 'D' to '^' as in FIG. 6(b) to input the first letter of the password. In like manner, the rest of the password letter cross-points, namely, 'O', 'G', 'A', 'U', and 'K' of the second alphanumeric matrix can each be moved to '^' of the first alphanumeric matrix to input the password 'DRAGON'.

Of course, it is possible to omit these steps for remembering the letters of the password in groups of two digits ($S_{2-1}$), finding the cross-points of the password letters remembered in groups of two digits ($S_{2-2}$), and moving the cross-points of the password letters remembered in groups of two digits to the user-defined value ($S_{2-3}$).

When inputting a password, the input of each letter included in the password can be completed by using a final entry key, such as the 'ENTER' key of a keyboard. For example, if the password is 'DRAGON', and just the password letters are to be moved to the user-defined value, the user can move 'D' of the second alphanumeric matrix to '^' of the first alphanumeric matrix and then press 'ENTER', move 'R' of the second alphanumeric matrix to '^' of the first alphanumeric matrix and then press 'ENTER' to input the second password letter, and likewise move each of 'A', 'G', 'O', and 'N' to '^' and press 'ENTER' every time, to input the entire password, 'DRAGON'. In this way, the input of each letter of the password can be completed by moving each password letter and pressing the 'ENTER' key. Thus, if the password is 'DRAGON', the 'ENTER' key can be pressed a total of six times to input each of the password letters. Of course, in cases where the password is to be inputted using the cross-points of the password letters, if the password is 'DRAGON', the number of password letter cross-points is also six, and the input of the password letter cross-points can be completed by pressing 'ENTER' a total of six times.

The step of rotating the alphanumeric matrices ($S_3$) may include rotating the alphanumeric matrices after the step of moving the password to the user-defined value ($S_2$) or after the step of moving the cross-points of the password letters remembered in groups of two digits to the user-defined value ($S_{2-3}$). Here, to rotate the alphanumeric matrices can be to rotate both the first alphanumeric matrix and the second alphanumeric matrix or to rotate one of the first alphanumeric matrix and second alphanumeric matrix. This embodiment will be illustrated using an example in which an alphanumeric matrix, as shown in FIG. 7(a), is rotated 90 degrees to the right to form the alphanumeric matrix shown in FIG. 7(b). Of course, although this embodiment is illustrated using an example in which at least one of the first alphanumeric matrix and second alphanumeric matrix is rotated 90 degrees to the right, the invention is not thus limited. For example, at least one of the first alphanumeric matrix and second alphanumeric matrix can be rotated 180 degrees or 270 degrees to the right. Of course, an embodiment of the invention can include not only rotating the alphanumeric matrices but also shuffling one or more rows and/or columns of the second alphanumeric matrix, such as to transform the alphanumeric matrix shown in FIG. 8(a) to that shown in FIG. 8(b).

In general, the inputting of a password is performed several times. An attacker may observe this and retrieve a certain level of information from previous inputting actions to guess the password or obtain the information to successfully receive authentication. If the alphanumeric matrices for inputting a password are the same every time, then, unless time is a factor in the input, an attacker may successfully receive authentication simply by repeating the input of the user. Thus, it can be seen that the format of the alphanumeric matrices may have to vary.

If, for the purpose of varying the format of the alphanumeric matrices, the alphanumeric matrix are generated randomly, then an attacker may obtain the password by way of an intersection attack. Thus, for every instance of authentication, a certain degree of similarity may have to be maintained with respect to previously used alphanumeric matrices. This similarity is greatly related with computation method.

Referring to FIG. 9, although the alphanumeric matrices of FIG. 9(a) and FIG. 9(b) may seem very different to the eyes of a human observer, the two are the same alphanumeric matrix because of the characteristics of their basic input method. Similarity can be defined by how different the sets forming the rows and columns are, and from this viewpoint, the two alphanumeric matrices are completely alike. The examples above can be used to verify that the sets forming each of the rows and columns are alike. Computation refers to finding the cross-point, which in turn is the same as finding the intersection of two sets. For the alphanumeric matrices of FIG. 9, the cross-point computation can be regarded as the following intersection computation. Here, the intersection computation for the alphanumeric matrix of FIG. 9(a) can be represented by Equation 1, while the intersection computation for the alphanumeric matrix of FIG. 9(b) can be represented by Equation 2.

$$\{O,P,Q,R,S,T,U\} \cap \{F,M,T,0,7,\%,+\} = \{T\} \qquad [\text{Equation 1}]$$

$$\{S,T,U,O,P,Q,R\} \cap \{7,\%,+,T,0,F,M\} = \{T\} \qquad [\text{Equation 2}]$$

It can be seen that Equation 1 and Equation 2 yield the same intersection set, as the result of an intersection computation is not affected by a mere alteration of the order of the elements within the sets. Therefore, the result of the computation is not changed by simply interchanging the elements while keeping the rows and columns intact. However, whereas a replay attack requires that the relative positions of the cross-points and the user-defined value be the same, this is not true for the above case, so that the probability for a replay attack to be successful is similar to the probability of the alphanumeric matrices being determined with the same relative positions for the cross-points and the user-defined value and is hence very low. Even if the alphanumeric matrices are used with completely the same level of similarity, and an attacker can observe the password being inputted several times, the password may not be compromised. All that the attacker may obtain is the cross-point information for a user-defined value presumed by the attacker. However, since this cross-point information is the same every time the password is inputted, the number of passwords possible from all possible sets cannot be reduced from this information.

By using the fact that the cross-points found by the user as the computation results are the same for all other password input sessions, the possible cross-points can be found according to all possible user-defined values, and the authentication can be achieved with a high probability. Because of these reasons, if the similarity is lowered, i.e. if an element is removed from of the row and column, then an attacker may guess the password by using this difference.

Referring to FIG. 10, the alphanumeric matrices of FIG. 10 are changed only in seven cells. For this case, the intersection computation for the alphanumeric matrix of FIG. 10(a) can be represented by Equation 3, while the intersection computation for the alphanumeric matrix of FIG. 10(b) can be represented by Equation 4.

$$\{O,P,Q,R,S,T,U\} \cap \{F,M,T,0,7,\%,+\} = \{T\} \quad \text{[Equation 3]}$$

$$\{C,P,Q,R,S,T,U\} \cap \{F,',T,0,7,\%,+\} = \{T\} \quad \text{[Equation 4]}$$

In this case, the intersection sets of corresponding rows and corresponding columns will show that one element has been removed for each row set and column set. Thus, even though only seven cells have been changed, the password can be compromised if the password input procedure is observed by a maximum of seven times. Also, since only seven of the cells have been changed in the matrices, there is a comparatively high probability that the relative positions of the cross-points and the user-defined value will remain the same. Thus, it is important to improve security from various aspects by integrating the cross-points and the user-defined value. As described above, this embodiment can provide a password input method using alphanumeric matrices that can defend against keylogging attacks and shoulder surfing attacks by including a movable second alphanumeric matrix and a fixed first alphanumeric matrix and enabling a user to input a password by moving the password letters of the second alphanumeric matrix to the user-defined value of the first alphanumeric matrix. This embodiment can also provide a password input method using alphanumeric matrices that can defend against shoulder surfing attacks by enabling a user to input a password by dividing the password by every two digits and moving the cross-points for the two digits, respectively, to the user-defined value of the first alphanumeric matrix. Furthermore, this embodiment can also provide a password input method using alphanumeric matrices that can more reliably defend against shoulder surfing attacks by rotating at least one of the first alphanumeric matrix and the second alphanumeric matrix every time a password letter is inputted.

A description will now be provided, with reference to the accompanying drawings, on a password input method using alphanumeric matrices according to a second disclosed embodiment of the invention in which two user-defined values are designated and the password is inputted using the cross-point of the two user-defined values. In the descriptions that follow, certain content that is redundant over the descriptions provided above regarding the password input method according to the first disclosed embodiment of the invention will be omitted or abridged.

Figure 11:
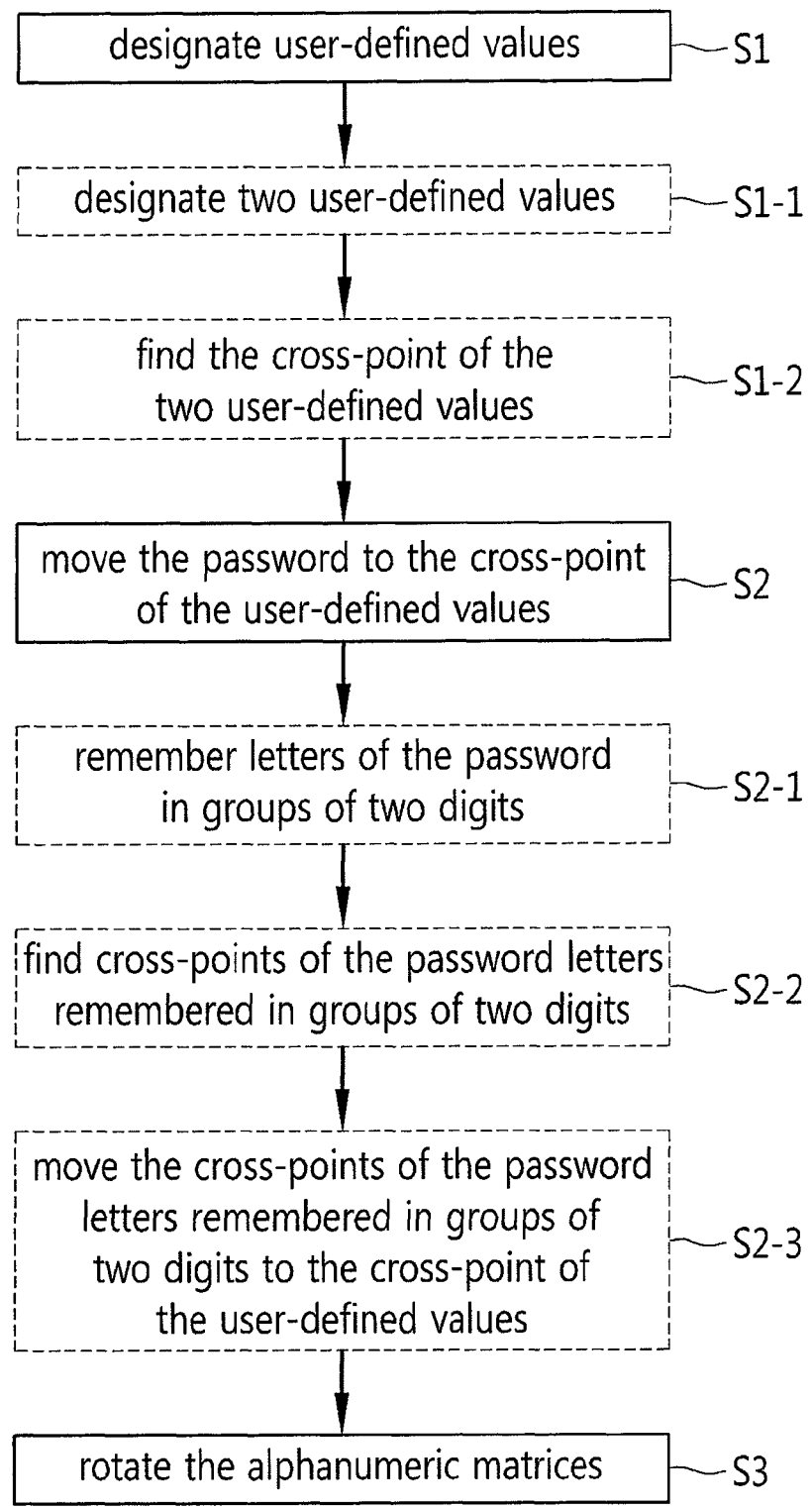
FIG. 11 is a flowchart illustrating a password input method using alphanumeric matrices according to a second disclosed embodiment of the invention.
Figure 13:
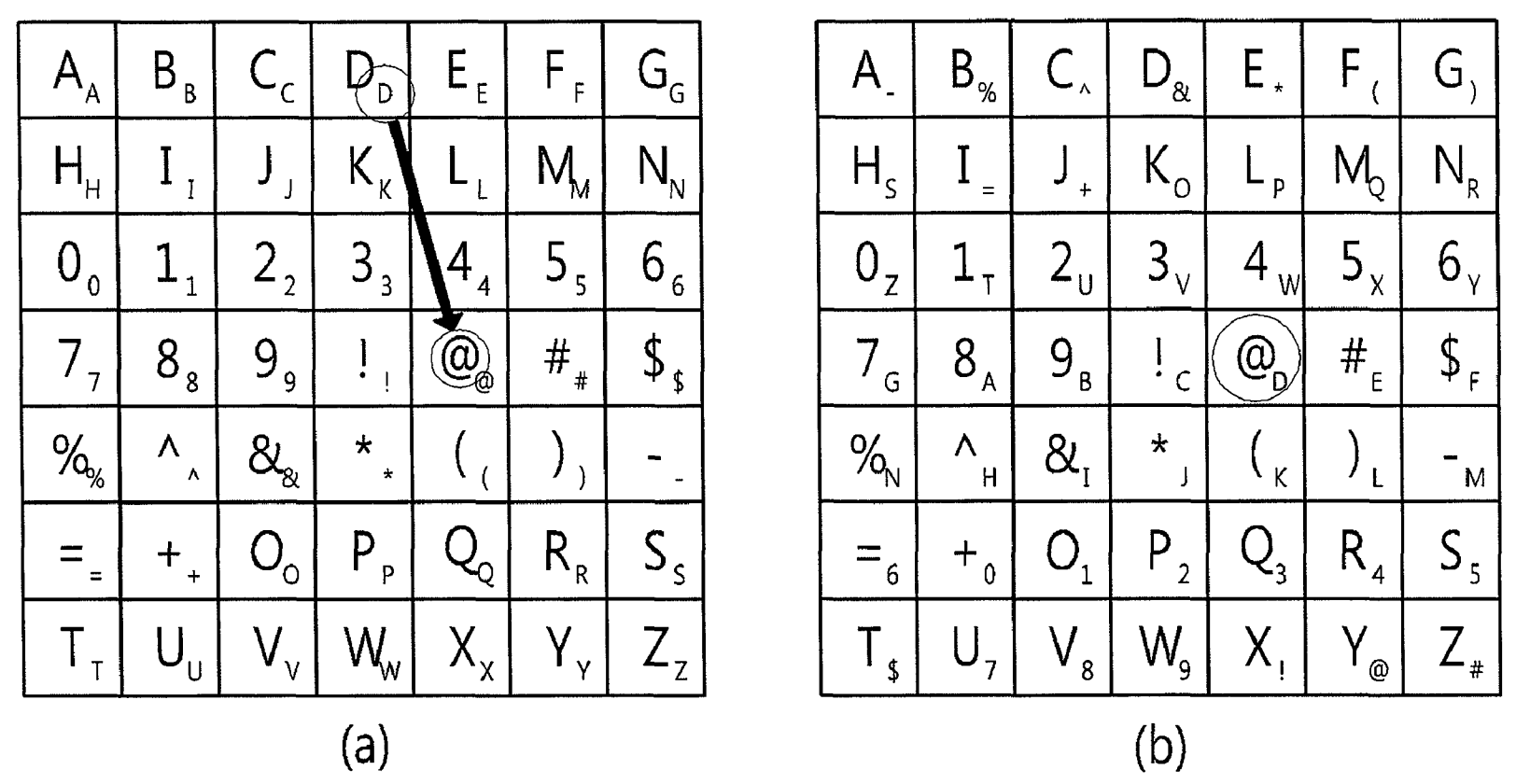
Figure 14:
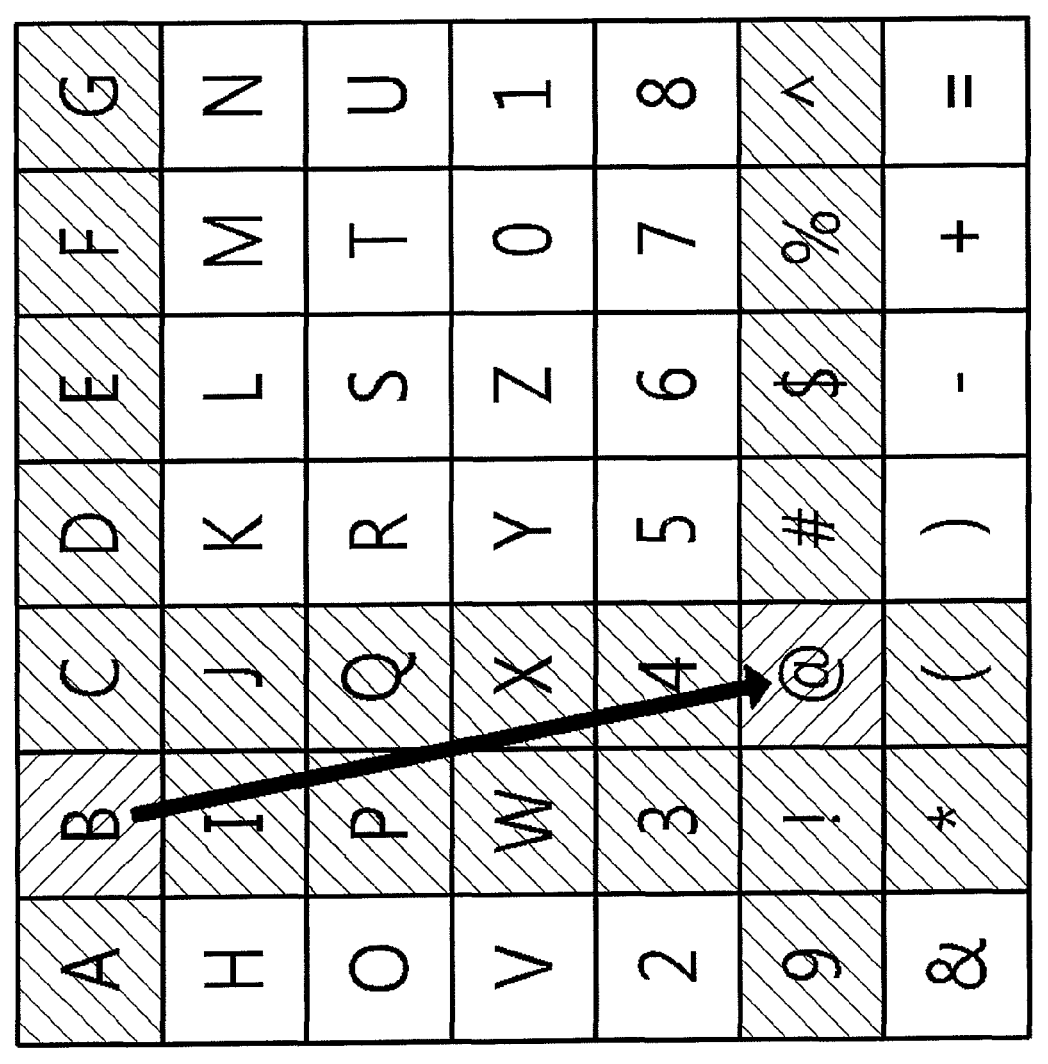

FIG. 11 is a flowchart illustrating a password input method using alphanumeric matrices according to a second disclosed embodiment of the invention, and FIG. 12 illustrates the finding of the cross-point of two user-defined values in the alphanumeric matrices according to the second disclosed embodiment of the invention. Also, FIG. 13 illustrating the moving of a password letter to the user-defined value cross-point in the alphanumeric matrices according to the second disclosed embodiment of the invention, and FIG. 14 illustrates the moving of a password letter cross-point to the user-defined value cross-point in the alphanumeric matrices according to the second disclosed embodiment of the invention.

As illustrated in FIG. 11, a password input method using alphanumeric matrices according to the second disclosed embodiment of the invention may include designating user-defined values ($S_1$), moving the password to the cross-point of the user-defined values ($S_2$), and rotating the alphanumeric matrices ($S_3$).

The step of designating user-defined values ($S_1$) may include designating two user-defined values, so as to provide a password input method that enables a stronger level of security than does the first disclosed embodiment of the invention described above. For this, the step of designating user-defined values ($S_1$) may include designating two user-defined values ($S_{1-1}$) and finding the cross-point of the two user-defined values ($S_{1-2}$).

The step of designating two user-defined values ($S_{1-1}$) may include the user remembering two arbitrary letters in the first alphanumeric matrix and thus designating two user-defined values, i.e. a first user-defined value and a second user-defined value. Here, it may be desirable to use different letters for the first and second user-defined values.

The step of finding the cross-point of the two user-defined values ($S_{1-2}$) may include using the first user-defined value and second user-defined value to find the cross-point of the user-defined values. That is, the letter positioned at the cross-point of the first user-defined value and second user-defined value in the first alphanumeric matrix becomes the cross-point of the user-defined values. For example, in FIG. 12, if the first user-defined value is '$', and the second user-defined value is '4', then the cross-point of the user-defined values becomes '@'.

The step of moving the password to the cross-point of the user-defined values ($S_2$) may include finding each letter of the password in the second alphanumeric matrix and moving it to the cross-point of the user-defined values in the first alphanumeric matrix. As in the example shown in FIG. 13(a) and FIG. 13(b), if the password is 'DRAGON', then the user may find the first letter of the password, 'D', in the second alphanumeric matrix and move it to the user-defined value cross-point, '@', in the first alphanumeric matrix. In like manner, the rest of the password letters can be inputted, to complete the input of the password.

Of course, for this embodiment also, it is possible to find the cross-points for the password and move these to the cross-point of the user-defined values, in a similar fashion as to that of the first disclosed embodiment of the invention described above. In this case, the step of moving the password to the cross-point of the user-defined values ($S_2$) may include remembering the letters of the password in groups of two digits ($S_{2-1}$), finding the cross-points of the password letters remembered in groups of two digits ($S_{2-2}$), and moving the cross-points of the password letters remembered in groups of two digits to the cross-point of the user-defined values ($S_{2-3}$). In the steps of remembering the letters of the password in groups of two digits ($S_{2-1}$) and finding the cross-points of the password letters remembered in groups of two digits ($S_{2-2}$), the user may remember the password in groups of two digits starting from the front, and then find the cross-points for the password letters remembered in groups of two digits using the second alphanumeric matrix, in substantially the same manner as that of the first disclosed embodiment of the invention described above. This embodiment will be illustrated using an example in which '@' of the first alphanumeric matrix is found to be the user-defined value cross-point, as illustrated in FIG. 14.

The step of moving the cross-points of the password letters remembered in groups of two digits to the cross-point of the user-defined values ($S_{2-3}$) may include moving the cross-points of the password letters to the cross-point of the user-defined values in the first alphanumeric matrix, and thereby inputting the password. For example, if the first two letters of the password are 'D' and '3', then the first cross-point of the password becomes 'B', as illustrated in FIG. 14. Thus, the user may find the first password cross-point, 'B', in the second alphanumeric matrix and move it to the cross-point of the user-defined values, '@', of the first alphanumeric matrix, and thereby complete the input of the first password cross-point. In like manner, the remaining cross-points of the password may be moved to the user-defined value cross-point, '@', to complete the input of the entire password.

The step of rotating the alphanumeric matrices ($S_3$) may include rotating the alphanumeric matrices after the step of moving the password to the cross-point of the user-defined values ($S_2$) or after the step of moving the cross-points of the password letters remembered in groups of two digits to the cross-point of the user-defined values ($S_{2-3}$), in substantially the same manner as that of the first disclosed embodiment of the invention described above. Here, to rotate the alphanumeric matrices can be to rotate at least one of the first alphanumeric matrix and the second alphanumeric matrix by 90 degrees, 180 degrees, or 270 degrees to the right or the left.

As described above, this embodiment can provide a password input method using alphanumeric matrices that can more reliably defend against keylogging attacks and shoulder surfing attacks by using the cross-point of two user-defined values.

While the present invention has been described above with reference to particular drawings and embodiments, those skilled in the art will understand that numerous variations and modifications can be conceived without departing from the spirit of the present invention as disclosed by the scope of claims below.

What is claimed is:

1. A password input system using alphanumeric matrices, the password input system comprising:
    a first and a second alphanumeric matrix;
    an alphanumeric matrix movement module configured to move each letter of a password included in the second alphanumeric matrix to a user-defined value, the user-defined value included in the first alphanumeric matrix and arbitrarily designated by a user;
    a password input confirmation module configured to confirm a password inputted as the second alphanumeric matrix is moved to the first alphanumeric matrix; and
    an alphanumeric matrix rotation/shuffle module configured to rotate or shuffle at least one of the first alphanumeric matrix and the second alphanumeric matrix, whenever an input of one letter is completed by moving the second alphanumeric matrix to move one letter included in the second alphanumeric matrix forming a password to the user-defined value of the first alphanumeric matrix.

2. The password input system using alphanumeric matrices according to claim 1, wherein an input tool for moving the second alphanumeric matrix is selected from a group consisting of a keyboard, a keypad, a mouse, and a touchscreen.

3. The password input system using alphanumeric matrices according to claim 2, further comprising:
    a mouse pointer removal module configured to remove a pointer of the mouse.

4. A password input method using two alphanumeric matrices including a fixed first alphanumeric matrix and a movable second alphanumeric matrix, the password input method comprising:
    designating an arbitrary user-defined value from letters included in the first alphanumeric matrix; and
    using an alphanumeric matrix movement module to move the second alphanumeric matrix to move each letter included in the second alphanumeric matrix forming a password to the user-defined value of the first alphanumeric matrix; and
    wherein said using the alphanumeric matrix movement module further comprises:
    rotating a whole of or shuffling a row or a column of at least one of the first alphanumeric matrix and the second alphanumeric matrix,
    whenever an input of one letter is completed by moving the second alphanumeric matrix to move one letter included in the second alphanumeric matrix forming a password to the user-defined value of the first alphanumeric matrix.

5. The password input method using alphanumeric matrices according to claim 4, wherein the designating of the arbitrary user-defined value from letters included in the first alphanumeric matrix comprises:
    designating two different user-defined values from letters included in the first alphanumeric matrix; and
    designating a user-defined value as a cross-point of a row and a column of the two user-defined values, respectively, in the first alphanumeric matrix.

6. A method of inputting a password having n digits using two alphanumeric matrices including a fixed first alphanumeric matrix and a movable second alphanumeric matrix, the password input method comprising:
    designating a user-defined value from letters included in the first alphanumeric matrix;
    remembering a password letter sequence having two digits from letters forming the password;
    finding a cross-point of a row of a first letter and a column of a second letter of the two-digit password letter sequence in the second alphanumeric matrix; and
    using a movement module successively to move the cross-point of the second alphanumeric matrix to the user-defined value of the first alphanumeric matrix by moving the second alphanumeric matrix;
    wherein the two-digit password letter sequences are formed as {[first digit, second digit], [second digit, third digit], . . . , [n-th digit, first digit]} of the password; and
    said using the movement module further comprises:
    rotating a whole of or shuffling a row or a column of at least one of the first alphanumeric matrix and the second alphanumeric matrix, whenever an input of one cross-point of the two-digit password letter sequence is completed by moving the second alphanumeric matrix to move one cross-point of the two-digit password letter sequence included in the second alphanumeric matrix to the user-defined value of the first alphanumeric matrix, whenever an input of one letter is completed by moving the second alphanumeric matrix to move one letter included in the second alphanumeric matrix forming a password to the user-defined value of the first alphanumeric matrix.

7. A method of inputting a password having n digits using two alphanumeric matrices including a fixed first alphanumeric matrix and a movable second alphanumeric matrix, the password input method comprising:

designating a user-defined value from letters included in the first alphanumeric matrix;

remembering a password letter sequence having two digits from letters forming the password;

finding a cross-point of a row of a first letter and a column of a second letter of the two-digit password letter sequence in the second alphanumeric matrix; and using a movement module successively to move the cross-point of the second alphanumeric matrix to the user-defined value of the first alphanumeric matrix by moving the second alphanumeric matrix;

wherein the two-digit password letter sequences are formed as {[first digit, second digit], [second digit, third digit], . . . , [n-th digit, first digit]} of the password; and wherein the designating of the arbitrary user-defined value from letters included in the first alphanumeric matrix comprises:

designating two different user-defined values from letters included in the first alphanumeric matrix; and designating a user-defined value as a cross-point of a row and a column of the two user-defined values, respectively, in the first alphanumeric matrix, whenever an input of one letter is completed by moving the second alphanumeric matrix to move one letter included in the second alphanumeric matrix forming a password to the user-defined value of the first alphanumeric matric.

* * * * *